May 15, 1956  J. M. TOWLER ET AL  2,745,253
COMBINED ADMISSION, RELIEF AND UNLOADING
VALVE AND HYDRAULIC POWER SYSTEM
Filed March 28, 1951  3 Sheets-Sheet 1
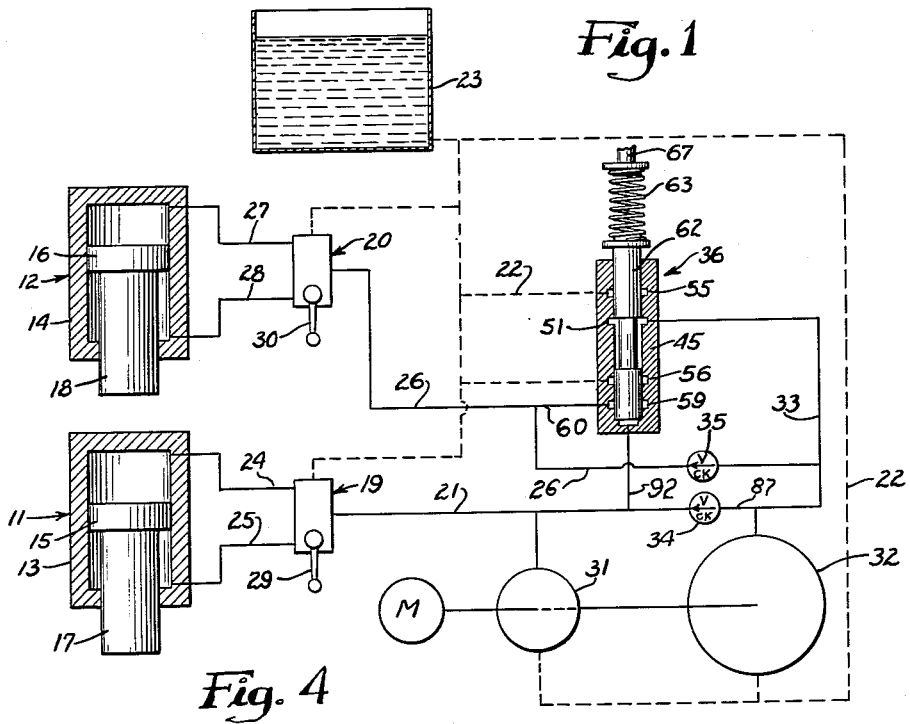
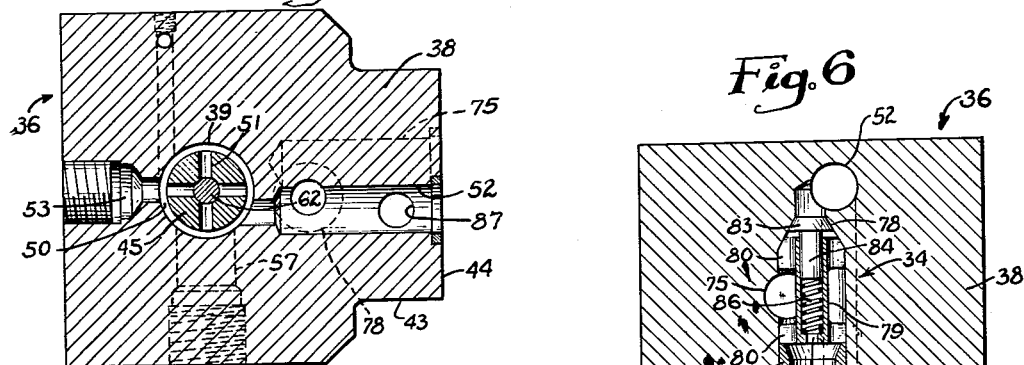
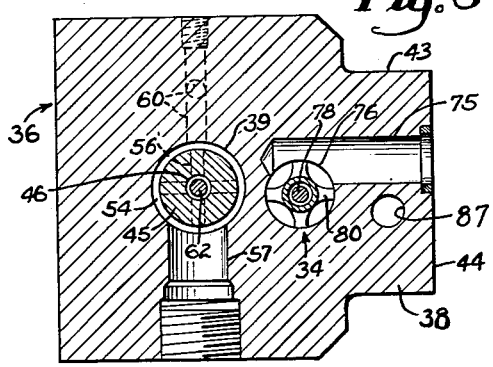
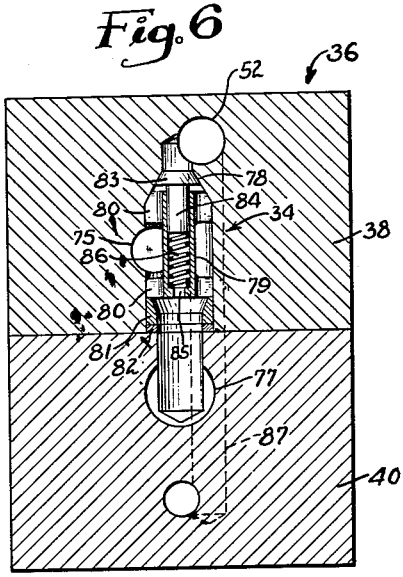
Inventors
John Maurice Towler
Frank Hathorn Towler
by: Carlson, Pitney, Hubbard & Wolfe
Attys.

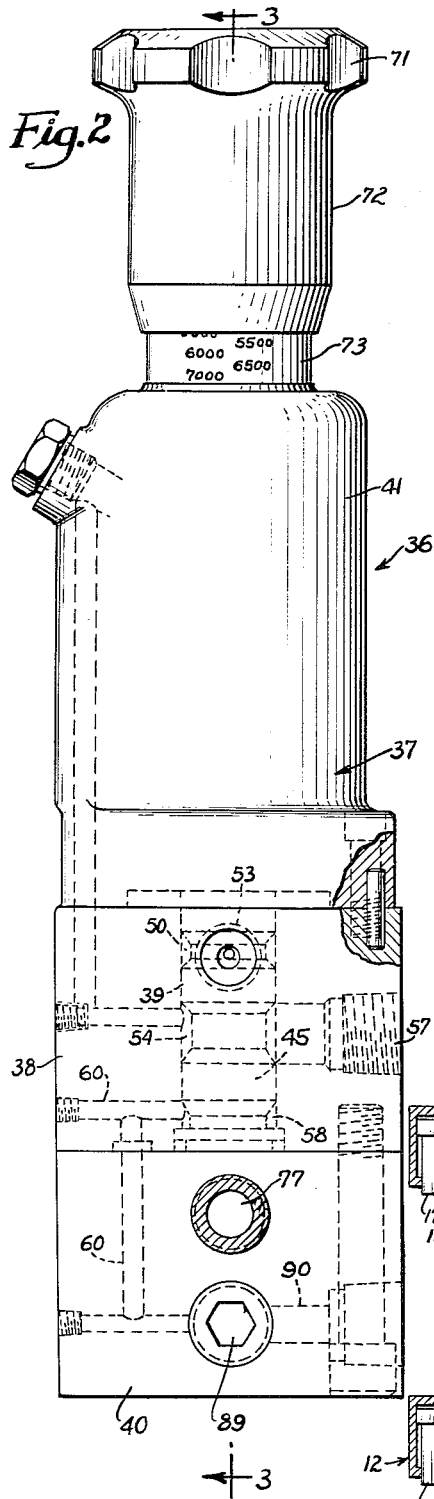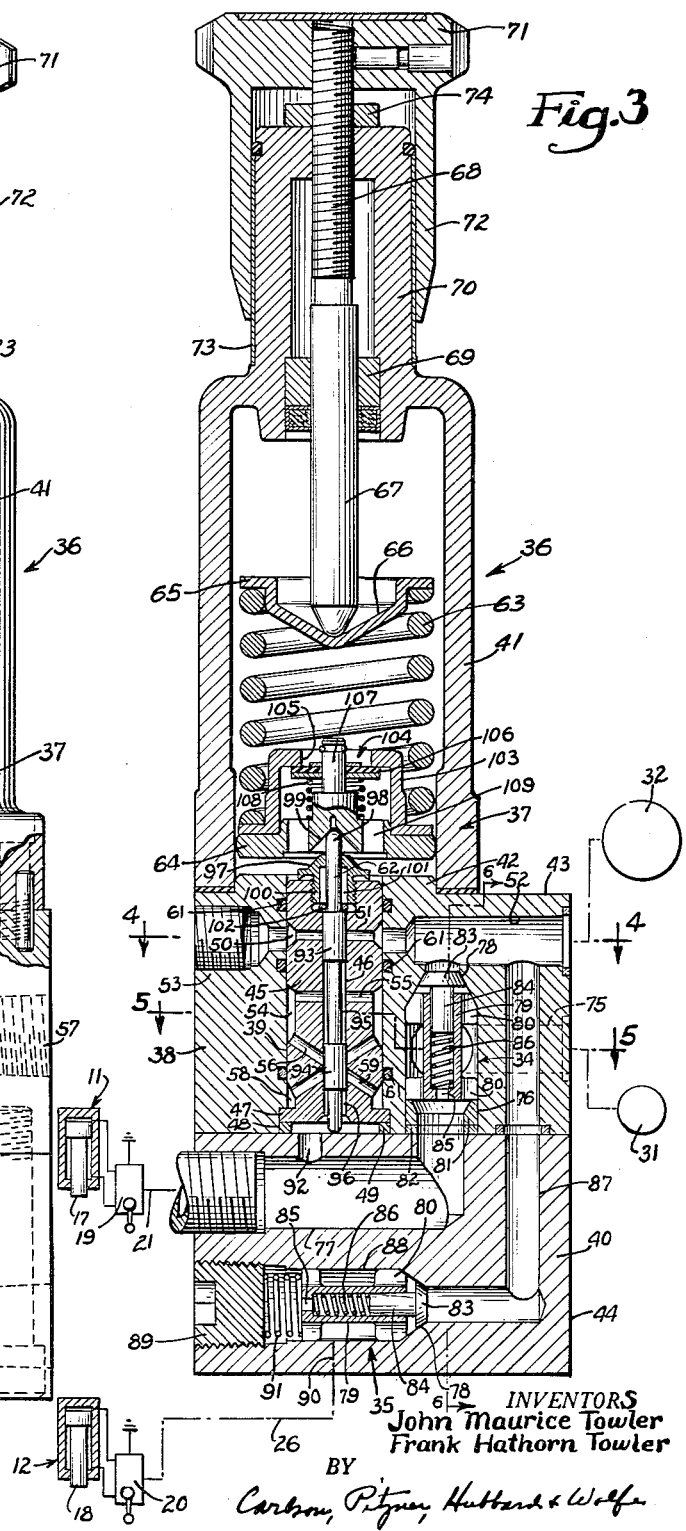

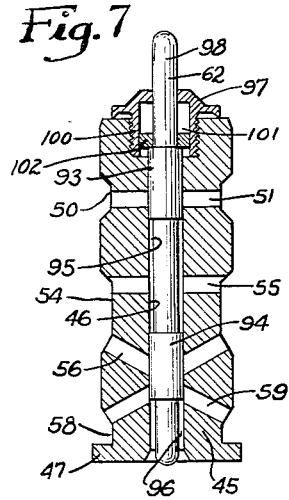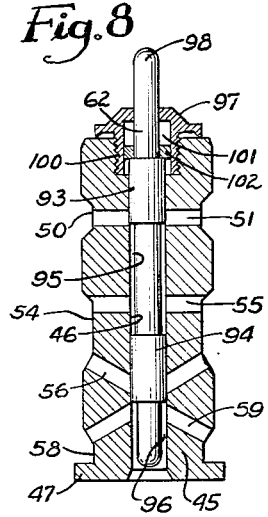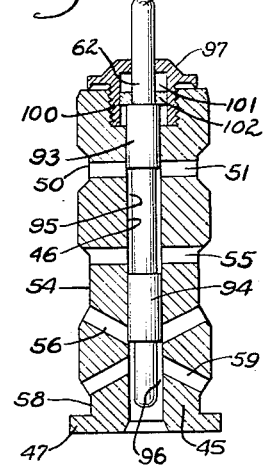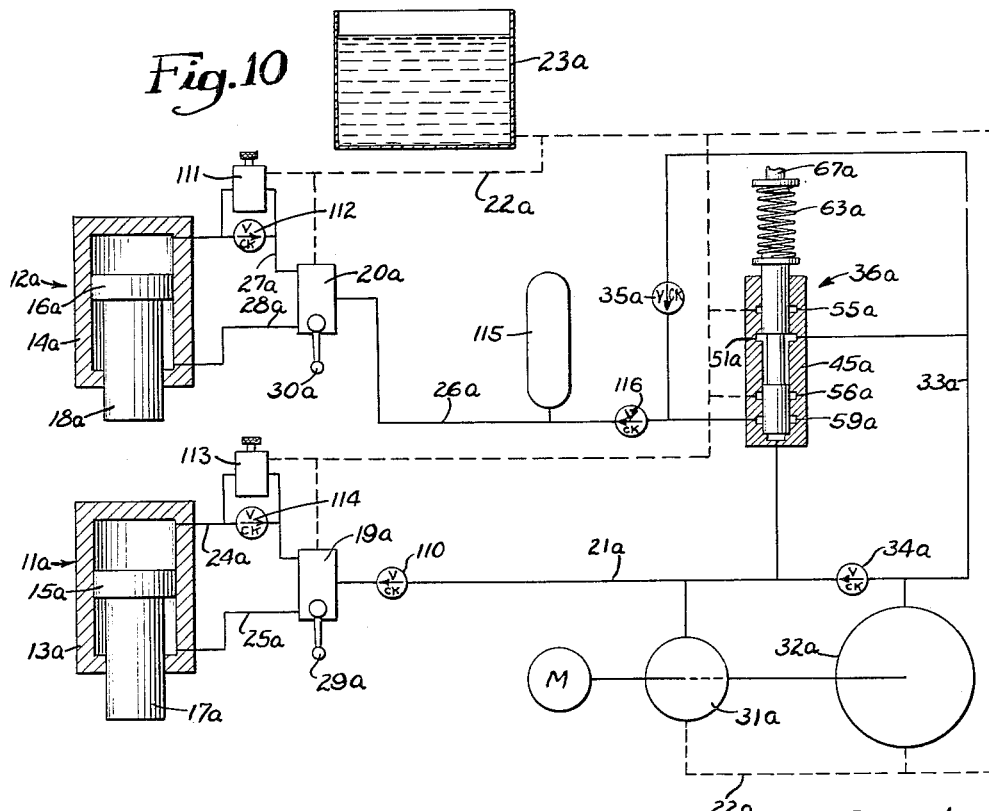

United States Patent Office 2,745,253
Patented May 15, 1956

2,745,253

COMBINED ADMISSION, RELIEF AND UNLOADING VALVE AND HYDRAULIC POWER SYSTEM

John Maurice Towler, Rodley, and Frank Hathorn Towler, Dob Park, near Otley, England, assignors to Electraulic Presses Limited, Rodley, England, a corporation of the Kingdom of England Application March 28, 1951, Serial No. 217,914

Claims priority, application Great Britain April 1, 1950

8 Claims. (Cl. 60—97)

The present invention relates to a new and improved combined admission, relief and unloading valve and hydraulic power system.

One of the objects of the present invention is to provide a combination unloading and relief valve for controlling the supply of pressure fluid in accordance with an integrated operating cycle from a plurality of fluid sources to a plurality of motors in a hydraulic machine.

Another object is to provide a valve of the foregoing character operable automatically to effect the passage of the combined delivery of pressure fluid from two sources to the first of two motors in a hydraulic machine until a predetermined pressure is attained, and then to maintain the pressure from the first of said sources and to unload the second source, and thereafter, while such pressure is being maintained on the first motor, to effect the passage of pressure fluid from the second source to the second motor until a predetermined pressure is attained, and then to maintain the pressure from the first source on both motors, and again to unload the second source.

A further object is to provide such a valve which will relieve excess fluid delivered by the first source while the pressure is being maintained on the first motor and on both motors, and which in relieving such excess fluid will divert the same to the second motor until the desired maximum holding pressure is attained in both motors.

Another object is to provide such a valve and control system in which the machine operating cycle is controlled by the movement of a minimum number of elements, e. g., only by the single valve plunger and two check valves.

Further objects and advantages will become apparent as the description proceeds.

In the accompanying drawings,

Figure 1 is a schematic representation of a hydraulic power system comprising an admission, relief and unloading valve in accordance with features of the present invention, certain valve elements being shown in structurally disassociated relation for purposes of simplicity.

Fig. 2 is a side elevational view of a combination admission, unloading and relief valve incorporated in the system of Fig. 1, and embodying features of the present invention.

Fig. 3 is a longitudinal sectional view of the valve taken along line 3—3 of Fig. 2, and shown in relation to the connecting lines of the system.

Figs. 4, 5 and 6 are respectively transverse sectional views taken along lines 4—4, 5—5 and 6—6 of Fig. 3.

Figs. 7, 8 and 9 are respectively fragmentary sectional views showing the valve plunger in different operative positions.

Fig. 10 is a schematic representation of a modified form of the hydraulic power system.

Referring more particularly to the drawings, the hydraulic power system with the combination admission, unloading and relief valve, constituting the exemplary embodiment of the present invention, is especially adapted to operate machines of the type in which a plurality of independent hydraulic motors are subject to selective actuation, in accordance with a prescribed sequence, program or cycle, by hydraulic pressure from a plurality of fluid sources. For example, the system may be applied with particular advantage to machines for transfer moulding or die casting in which one hydraulic motor is operative to close the mould and to hold it tightly in closed position, and another hydraulic motor is operative to force or inject plastic material or molten metal into the closed mould. The system, of course, is not limited in its usefulness to these particular machines, but may be applied with substantially equal facility to a variety of machines for different purposes having a generally similar operating cycle.

For purposes of illustration, the system is disclosed as comprising or serving two hydraulic motors 11 and 12 for carrying out the operating cycle of the machine (not shown). The motors 11 and 12 may be of any suitable character, and in the present instance are of the reversible piston and cylinder type. Thus, as applied to a transfer moulding machine or die sinking machine, the motors 11 and 12 respectively have cylinders 13 and 14 and pistons 15 and 16 reciprocable therein. These pistons have rods or rams 17 and 18 projecting from the cylinders 13 and 14, the ram 17 being operable on its outward stroke to close and hold closed the machine mould (not shown), and the ram 18 being operable on its outward stroke to effect injection of the plastic or molten material into the closed mould.

Suitable directional control valves 19 and 20 are provided for the hydraulic motors 11 and 12. As shown, the valve 19 has connections with a supply line 21 adapted to receive pressure fluid from a suitable source, an exhaust line 22 leading to a fluid reservoir 23, and two lines 24 and 25 leading respectively to opposite ends of the motor cylinder 13. Similarly, the valve 20 has connections with a supply line 26 adapted to receive pressure fluid from a suitable source, the exhaust line 22, and two lines 27 and 28 leading respectively to opposite ends of the motor cylinder 14. These valves may be of any desired conventional form, and hence are not disclosed in detail. It is sufficient to state that the valves 19 and 20 may be alike in construction, and that each has an operating element 29 or 30 whereby it may be adjusted selectively into neutral position to block the pressure fluid inlet, or into forward or reverse operating position to connect the corresponding cylinder line to pressure and the other line to exhaust.

The independent sources of pressure fluid also may be of any suitable character, and in the present instance are shown as comprising two pumps 31 and 32 taking fluid through the exhaust line 22 from the reservoir 23. Preferably, the pump 31 is of relatively small capacity and suitable for pressure sustaining purposes, and the pump 32 is of relatively large capacity, for example, approximately four times that of the pump 31. The delivery outlet of the pump 31 is connected directly to the supply line 21 leading to the inlet of the control valve 19. The delivery outlet of the pump 32 is connected to a line 33 which in turn is connected through a non-return valve 34 to the line 21 and through a non-return valve 35 to the line 26 leading to the inlet of the valve 20.

A combination admission, unloading and relief valve 36, incorporated in the hydraulic system, is automatically operable in response to pressure conditions influenced by appropriate adjustments of the control valves 19 and 20 and resistances encountered by the motors 11 and 12 to control or direct the pressure fluid delivery of the pumps 31 and 32 as required for the operating cycle of the machine. More particularly, through the action of the valve 36, upon adjustment of the valve 19 into forward position, the combined delivery of both pumps 31 and 32 is directed through the line 24 to the piston 15 until a predetermined pressure is attained, and then the pump 32 is unloaded and the pump 31 remains effective to maintain pressure on the piston; and, upon subsequent adjustment of the valve 20 into forward condition, the delivery of the pump 32 is directed through the line 27 to the piston 16 until a predetermined pressure is attained, and then the pump 32 is again unloaded and the pump 31 is rendered effective to maintain pressure on both pistons. Thus, as applied specifically to a transfer moulding machine, the piston 15 would be actuated to close the mould, and would then be maintained under pressure to hold the mould in closed position, and, thereafter, during the maintenance of pressure on the piston 15, the piston 16 would be actuated to inject the plastic material into the mould and would then also be maintained under pressure to confine the material during the setting period, the large capacity pump 32 being unloaded upon satisfaction of large volumetric requirements at the end of each approach movement.

The combination valve 36, in its preferred form (Figs. 2 to 6), comprises a body or housing 37 which preferably is constructed of a plurality of sections suitably bolted or otherwise secured together in cooperative assembled relation. Thus, the body 37 includes a main block 38 of rectangular form having a bore 39 opening therethrough, a base block 40 of rectangular form secured in face-to-face registration against the underside of the block 38 in position to close one end of the bore 39, and a spring casing 41 of generally tubular form secured in axial alignment with the bore 39 to the upper side of the block 38. For accurate assembly, the lower or contiguous end of the spring casing 41 is fitted about a short circular pilot projection 42 on the top surface of the main block 38. At one side of the casing 41, the assembled blocks 38 and 40 have a lateral projection 43 with a flush outer mounting face 44 adapted for attachment to a suitable support (not shown). It will be understood that the various lines or flow passages to this face, instead of comprising pipes or conduits, may be connected thereto through a gasketed panel arrangement.

Considering now the valving elements, a tubular valve bushing 45, with an axial valve bore 46 opening therethrough, is tightly fitted in the bore 39, and is located axially therein by means of a peripheral end flange 47 seated in a counterbore 48 in the lower end of the valve bore. A rubber washer 49 is interposed between the flange 47 and the contiguous surface of the block 40 so that in the assembly of the valve body 37 the bushing 45 is confined securely in position.

The valve bushing 45 is formed in one transverse plane (Fig. 4) with an external peripheral groove 50 and a plurality of radial ports 51 opening from the groove to the internal valve bore 46. In this same plane, the block 38 is formed with a transverse passage 52 opening to the groove 50 and extending to the mounting face 44 for connection to the line (conduit or cored passage) from the discharge outlet of the large capacity pump 32. Although not essential, the block 38 is also formed with another transverse passage 53 also opening to the groove 50 and extending to an exterior surface for connection to still another pump or source of pressure fluid, should such be desirable in any particular application of the invention. Assuming no need for such second pressure fluid source the passage 53 would be sealed or plugged.

In an intermediate transverse plane (Fig. 5), the valve bushing 45 is formed with a somewhat wider external peripheral groove 54 connected at one side through a plurality of radial ports 55 to the valve bore 46, and at the other side through a plurality of radial, longitudinally inclined ports 56 to the valve bore. In this plane, the block 38 is formed with a transverse passage 57 opening to the groove 54 and extending to the exterior for connection to the exhaust line 22. Thus, both sets of ports 55 and 56 are provided for exhaust purposes.

The valve bushing 45, adjacent its lower end is formed with still another external peripheral groove 58 connected through a plurality of radial, longitudinally inclined ports 59 to the valve bore 46. In this instance, the valve block 38 is formed with a transverse passage 60 connected with the line 26.

Suitable O ring seals 61 may be inserted in the surface of the bore 39 at opposite sides of the ports 51 and between the sets of ports 56 and 59 to insure against objectionable leakage.

A movable valve element 62 in the form of a plunger is slidably reciprocable in the valve bore 46 to control the various connections of the ports 51, 55, 56 and 59 as hereinafter explained. One end of the valve plunger 62 projects into the counterbore 48 and is adapted to seat endwise against the block 40 in normal idle position. The other end of the plunger 62 projects from the end of the bushing 45 into the casing 41, and is therein subjected endwise to the action of a coiled compression spring 63 normally maintaining it in idle position. The spring 63 is enclosed within the casing 41 which is oil filled, and is interposed between and in abutting engagement at opposite ends with two spring retainer pads 64 and 65. One of these pads, namely, the pad 64, is disposed in the lower end of the casing 41, and the other pad 65 has a centering depression 66 engageable by the conical end of a stem 67 on an adjusting screw 68. This stem extends slidably through a guide bushing 69 into a tubular projection 70 on the free end of the casing 41. The screw 68 extends through and is in threaded engagement with the outer end wall of the projection 70. A hand knob 71 is fixed to the outer end of the screw 68 and affords means for turning the latter to adjust the tension of the spring 63 at will to suit the required operation. The knob 71 is provided with a micrometer sleeve 72 which telescopes with the projection 70 and coacts with a suitable scale 73 on the latter to indicate the degree of spring adjustment. A stop washer 74 on the end of the projection 70 is engageable by the inner face of the knob 71 to limit the degree of adjustment, and may be provided in different thicknesses so as to permit selective variation of the limits of adjustment.

The main valve block 38 is formed with a transverse passage 75 which opens to the mounting face 44 for connection with the small capacity pump 31, and which at the inner end is in communication with a bore 76 parallel to the bore 39 and constituting a chamber for the non-return check valve 34. The bore 76 opens freely to a transverse passage 77 formed in and opening to one side of the base block 40 for connection to the control valve 19. Thus, the delivery line 21 from the pump 31 to the control valve 19 is routed through the valve body 37, entering at the passage 75 and leaving at the passage 77.

The bore 76 is also connected at one end to the passage 52 through a conical valve seat 78 forming part of the check valve 34. A tubular guide sleeve 79 is mounted coaxially within the bore 76 and is formed on the outer periphery at opposite ends with circumferentially-spaced locating lugs 80 permitting the free passage thereabout of fluid from the passages 52 and 75 to the passage 77. The lugs 80 at one end engage the seat 78, and at the other end are engaged by a holding collar 81. A rubber joint ring 82 is interposed between the collar 81 and the contiguous surface of the block 40. The check valve 34 comprises a valve member 83 having a stem 84 slidably guided in one end of the sleeve 79, and normally engaging the seat 78. The other end of the sleeve 79 is closed, except for a vent opening 85, and a coiled compression spring 86 disposed therein tends to urge the valve member 83 outwardly into seated position. The arrangement is such that for large volume requirements, the delivery of both pumps 31 and 32 will be directed from the passages 52 and 75 to the valve bore 76 and thence to the passage 77. However, when the pressure in the passage 77 exceeds that in the passage 52, the valve 34 will close, and thereupon only the small pump 31 will remain connected to deliver fluid to the passage 77.

Also formed in the blocks 38 and 40 of the valve body 37 are registering bores defining a down-flow passage 87 opening from the passage 52 to a transverse bore 88 in the block 40 and constituting a chamber for the non-return or check valve 35. The outer end of the transverse bore 88 is closed by a plug 89 and the bore is connected at one side to the passage 60 in communication with the peripheral groove 58, and at the other side to a passage 90 opening to one side of the block 40 for connection to the control valve 20. Thus, the large capacity pump 32 is always in direct communication through the check valve 35 with the control valve 20, the line 26 in effect being routed through the valve body 37.

The check valve 35 is substantially the same in construction as the valve 34, and corresponding parts are, therefore, identified by the same reference numerals, the only difference being that the guide sleeve 79 is confined in position against seat 78 by means of a coiled compression spring 91 reacting against the plug 89.

The transverse passage 77 is in communication through a port 92 with the adjacent end of the bore 39 so as to expose the lower end of the valve plunger 62 at all times to the pressure developed by the pump 31.

The valve plunger 62 is formed with axially spaced cylindrical heads 93 and 94 slidable in the valve bore 46 and separated by a wide peripheral recess 95 always in communication with the exhaust ports 55, and normally out of but movable into communication with the unloading ports 51. At the lower end, the plunger 62 is reduced in diameter to form a peripheral recess 96 always open to the pressure port 92, and normally out of but movable into communication first with the ports 59 and then with the relief ports 56 as the plunger is moved progressively upward in response to a predetermined increasing fluid pressure gradient. The upper end of the plunger 62 is also reduced in diameter and extends slidably through a stop ferrule 97 for engagement with the spring retainer pad 64. The extreme end of the plunger 62 is rounded about a center 98 and engages in a seating recess 99. The ferrule 97 is secured in the upper end of the valve bushing 45, and has an inner sleeve 100 formed with a bore 101 adapted to receive the uppermost head 93 on the plunger 62. A stop washer 102 encircles the upper end of the plunger 62 in position against the head 93, and is engageable with the upper end of the bore 101 to limit upward movement of the plunger.

The valving functions of the plunger 62 will be evident from the foregoing. Briefly stated, the plunger 62 in normal position (Fig. 3) blocks the ports 51, 56 and 59 so as to load both pumps 31 and 32. In a second position (Fig. 7), the plunger 62 is elevated to establish a branch connection from the flow line 21 of the low capacity pump 31 through the passage 77, the port 92, the recess 96, the ports 59, the groove 58, the passage 60 and the valve bore 88 to the flow line 26 leading from the large capacity pump 32 to the control valve 20. In the third position (Fig. 8), the plunger 62 is elevated to bring the recess 95 into communication with the ports 51, thereby unloading the large capacity pump 32 through the ports 55 and groove 54 to the exhaust line 22. In the fourth position (Fig. 9), the plunger 62 is elevated sufficiently to establish restricted communication between the peripheral recess 96 and the ports 56 for exhausting excess fluid delivered by the low capacity pump 31. In this position, the plunger 62 acts as a relief valve member tending to maintain pressure in the delivery line 21 from the pump 31. During such relief, holding pressure is made available at both valves 19 and 20.

Means is provided for damping the return movement of the valve plunger 62 toward and into normal position. In one form of such means, a domed cap 103 is seated over the lower spring pad 64 and held thereagainst by the pressure of the spring 63. The domed cap 103 encloses a non-return or check valve 104 permitting free upward movement of the plunger 62 and pad 64. In the present instance, the valve 104 comprises a port 105 in the end wall of the cap 103, and a valve washer 106 slidably confined on an axial stem 107 projecting upwardly from the pad 64. A coil compression spring 108 encircling the stem 107 tends to maintain the valve washer 106 against the end wall of the cap 103 to close the port 105. The pad 64 is formed with openings 109 permitting free flow of oil from the interior of the cap to the lower end of the spring casing 41, and has a loose sliding fit in the lower portion of the spring casing 41 defining sufficient clearance for damping purposes. In the upward movement of the valve member 62, oil will pass freely through the non-return valve 104 and the openings 109 to permit unimpeded action. In the reverse movement of the valve plunger 62, the increased pressure in the lower portion of the spring casing 41 will close the non-return valve 104 so that fluid can be displaced only through the clearance between the periphery of the spring pad 64 and the inner wall surface of the casing 41, thereby damping the action. So as to prevent variation in the effective bleed area of the clearance and also possible binding in case the spring pad 64 should cant slightly on the upper end of the valve plunger 62, the peripheral surface of the pad is made spherical about the center 98 of the upper rounded plunger end.

The operation of the valve 36 and the system in which it is incorporated (Figs. 1 to 9) will be evident from the foregoing description, and briefly summarized is as follows:

Assuming the valve 36 to be in normal or idle position I (Fig. 3) and the control valves 19 and 20 to be in their neutral positions, operation of the pumps 31 and 32 will charge the system. Upon a predetermined increase in pressure, the valve 36 will move into position III, thereby unloading the pump 32. Upon further pressure increase to maximum, determined by the setting of the spring 63, the valve 36 will move into position IV, thereby relieving excess fluid delivered by the pump 31.

Assume now that the control valve 19 is moved into forward position, the valve 20 being retained in neutral position. Opening of the line 21 to the line 24 to deliver fluid to the motor 11 will produce an immediate pressure drop, and as a result the valve 36 will return to position I to load the pump 32, and thereupon the combined delivery of the pumps 31 and 32 will be directed to advance the piston 15 in its forward or approach stroke, i. e., to close the machine mould.

At the end of the forward stroke, and as the working resistance increases, the pressure will again build up and cause the valve 36 to move first into position III so as to unload the pump 32 and then into position IV so as to relieve the pump 31 to exhaust, while maintaining the maximum predetermined pressure for holding the mould tightly in closed position. This condition, with the pump 32 unloaded, and the delivery of the pump 31, except for the small amount of make-up fluid required for pressure maintenance going to exhaust, will prevail until the injection operation is initiated.

Assume now that, with the valve 19 retained in forward position, the valve 20 also is moved into forward position. Consequent opening of the line 26 to line 27 to deliver fluid to the motor 12 will produce again an immediate pressure drop sufficient to cause the valve 36 to load the pump 32 and to block the relief connection of the pump 31 to exhaust. Thus, the valve 36 will return to position II, leaving ports 59 partially open. As a result, excess fluid from the pump 31 over that required for pressure maintenance on the mould will be relieved through the ports 59 into the line 26, instead of to exhaust, and will be combined with the full delivery of the pump 32 for actuating the motor 12. Thereupon, the piston 16 will advance in its forward stroke to effect injection of plastic or molten material into the mould, or in an approach movement for some other applications. However, assuming an injection moulding or die casting operation, when the mould has been filled, the fluid pressure will again build up as the working resistance encountered by the motor 12 increases. In response to the sharp pressure increase, the valve 36 will move, as before, first to position III to unload the pump 32 and then into position IV so as to relieve excess fluid delivered by the pump 31, while maintaining maximum pressure on both motors 11 and 12. This attained condition will prevail as long as the control valves 19 and 20 are retained in their forward positions.

Assume that in due course the valves 19 and 20 are moved in desired sequence into their reverse positions. Thereupon, pressure fluid will be respectively supplied through the lines 25 and 28 to the motors 11 and 12, and exhausted therefrom through the lines 24 and 27 so as to retract the pistons 15 and 16. In such reverse operations, the action of the admission, unloading and relief valve will be much the same as heretofore described. Thus, for large volumetric fluid requirements, the deliveries of the pumps 31 and 32 will be combined, and as the pressure builds up in each step the pump 32 will be unloaded, and the pump 31 will maintain pressure in its delivery line, with relief of excess fluid. In this connection, pressure will build up as each of the pistons 15 and 16 reaches the end of its return stroke.

At completion of the operating cycle of the machine, the control valves 19 and 20 should be returned to neutral position. This will reestablish the conditions which existed at the start, both pumps unless stopped delivering to exhaust.

In the foregoing operation, the check valve 34 acts to prevent reverse flow from the pump 31 to the pump 32 when the latter is unloaded, and the check valve 35 acts to prevent reverse flow to the delivery line of the pump 32 when the pump 31 is maintaining pressure on the motor 12. These two check valves 34 and 35 and the simple plunger 62 of the valve 36 constitute the only moving parts, subject to appropriate adjustment of the control valves 19 and 20, required to effect the foregoing rather complicated though advantageous sequence of operations. Thus, a correlated operation of a plurality of hydraulic motors by pressure fluid supplied by a plurality of fluid sources to satisfy widely varying volumetric requirements and to provide for actuation and pressure maintenance of a plurality of machine elements in accordance with a complex cycle is accomplished by simple and inexpensive control means with a minimum loss of energy.

The modified form of system illustrated in Fig. 10 is generally similar to that of Fig. 1, and hence corresponding parts are identified by the same reference numerals, plus the letter $a$. The main differences reside in the addition of a number of secondary control devices. Thus, a non-return or check valve 110 is shown interposed in the line 21$a$ at the inlet to the control valve 19$a$ so as to insure against any blow-back of pressure fluid in the event the mould should tend to open as a result of excess pressure of the molten material during the injection stroke of the motor 12$a$.

A pressure reducing valve 111 may be interposed in the cylinder line 27$a$ leading from the control valve 20$a$ to the hydraulic motor 12$a$ to limit the maximum fluid pressure that can be applied to the piston 16$a$ during the injection stroke. A check valve 112 is connected in parallel across the valve 111 to permit free reverse flow of pressure fluid during the return stroke. Such alternate form, without a corresponding provision for the motor 11$a$ would result in an arrangement in which the maximum pump pressure would be available to operate the mould, and a reduced pressure, regulated by the valve 111 would be available to operate the piston 16$a$ on its forward stroke.

A pressure reducing valve 113, with a check valve 114 in parallel therewith to permit reverse flow, may also be interposed in the cylinder line 24$a$ from the control valve 19$a$ to the motor 11$a$. In such alternate form, provided with both valves 111 and 113, the maximum fluid pressures to both hydraulic motors 11$a$ and 12$a$ would be limited during forward operations.

Regardless of inclusion or exclusion of any of the elements 110 to 114, it may be advantageous in some applications to utilize a hydraulic accumulator of the pressure-loaded type as a proximate source of pressure fluid. Such an accumulator 115 is shown interposed in the supply line 26$a$ at the down-stream side of the check valve 35$a$. In such alternate form, the accumulator 115 will be charged or replenished with pressure fluid during compatible high pressure conditions in the system. Fluid from the charged accumulator 115 will be briefly available when the valve plunger 62$a$ is in position II or III, with the ports 59$a$ open, to combine with the delivery of the pumps 31$a$ and 32$a$ for the initial actuation of the motor 11$a$. Should this in some instances be considered undesirable, a non-return or check valve 116 may be interposed in the line 26$a$ to prevent reverse flow from the accumulator to the valve 36$a$. It will be evident that fluid from the charged accumulator 115 will be available to augment the delivery of the pumps 31$a$ and 32$a$ for effecting the rapid injection stroke of the piston 16$a$ when the control valve 20$a$ is opened.

The respective volumetric capacities of the pumps and the pressures which they are designed or set to develop may be varied to best suit the requirements of the particular type of machine to which the invention is applied. For example, in injection moulding machines, the pumps 31 and 32 may be capable of developing substantially the same maximum pressure since a large volume of high pressure fluid is usually required to effect a rapid injection stroke. In other instances, as where most of the forward stroke of each piston is taken up in a free approach movement and only a small portion thereof is expended for heavy working, the pump 32 may be provided to deliver a large capacity but set for relief at a relatively low pressure prior to being unloaded. Also, an auxiliary large displacement, low pressure pump (not shown) might be connected to the passage 53 to augment the volumetric capacity of the system, with the pumps 31 and 32 capable of developing higher pressures. In all of these arrangements, the operation of the programming valve 36 would be essentially the same.

We claim as our invention:

1. An unloading and relief valve comprising a body having first and second inlet passages adapted for connection to two separate sources of pressure fluid, first and second delivery passages in communication respectively with said first and second inlet passages adapted for connection to two separate pressure fluid operable motors, an exhaust passage, and a cross passage connecting said second inlet passage with said first delivery passage; a check valve interposed in said cross passage to prevent reverse flow from said first delivery passage to said second inlet passage, and valve means responsive to the pressure in said first delivery passage and operable progressively in the course of a predetermined rising pressure gradient first to connect said second delivery passage to said exhaust passage, and then also to relieve said first delivery passage to said exhaust passage while maintaining a predetermined maximum pressure in said first delivery passage, and in the course of a reverse of said gradient to interrupt said connections in reverse order.

2. An unloading and relief valve comprising a body having first and second inlet passages adapted for connection to two separate sources of pressure fluid, first and second delivery passages in communication respectively with said first and second inlet passages adapted for connection to two separate pressure fluid operable motors, an exhaust passage, a branch passage open to said second delivery passage, and a cross passage connecting said second inlet passage with said first delivery passage, a check valve interposed in said cross passage to prevent reverse flow from said first delivery passage to said second inlet passage, a check valve interposed in said second delivery passage to prevent reverse flow therefrom to said second inlet passage, and valve means responsive to the pressure in said first delivery passage and operable progressively in the course of a predetermined rising pressure gradient first to connect said first delivery passage to said branch passage, then also to connect said second delivery passage to said exhaust passage, and then also to relieve said first delivery passage to said exhaust passage while maintaining a predetermined maximum pressure in said first delivery passage, and in the course of a reverse of said gradient to interrupt said connections in reverse order.

3. An unloading and relief valve comprising structure having first and second inlet passages adapted for connection respectively to a small volume source and a large volume source of pressure fluid, first and second delivery passages in uninterrupted communication respectively with said first and second inlet passages and adapted for connection to two separate pressure fluid operable motors, and an exhaust passage, means normally connecting said second inlet passage with said first delivery passage to combine the two volumes of fluid adapted to be received from said sources, and valve means normally biased into closed position and movable in response to the prevailing pressure in said first delivery passage and operable progressively in the course of a predetermined rising pressure gradient first to connect said second delivery passage to said exhaust passage, and then also to relieve said first delivery passage to said exhaust passage while maintaining a predetermined maximum pressure in said first delivery passage.

4. An unloading and relief valve comprising a body having a valve bore and first, second, third and fourth sets of ports opening at axially spaced points to said bore, a first delivery passage in communication with one end of said bore and having an inlet adapted for connection to a first source of fluid pressure, a second delivery passage connected to said fourth set of ports and having an inlet adapted for connection to a second source of pressure fluid, an exhaust passage connected to said third and second sets of ports, a cross passage including a check valve for passing fluid from said second delivery passage to said first delivery passage, and a branch passage connected to said first set of ports and to said second delivery passage, a valve plunger slidable in said bore and exposed at one end to the pressure in said first delivery passage, and normally in position I blocking intercommunication between said sets of ports, adjustable spring means tending to bias said plunger into position I, said plunger having a peripheral end recess always open to said first delivery passage and an intermediate recess always open to said third set of ports, and being movable in response to a predetermined rising pressure gradient in said first delivery passage progressively out of position I first into position II to connect said end recess to said first set of ports whereby to deliver some fluid from said first delivery passage to said second delivery passage, then into position III to interconnect said fourth and third sets of ports through said intermediate recess to unload said second delivery passage, and then into position IV to connect said end recess to said second set of ports whereby to maintain a predetermined maximum pressure in said first delivery passage, and means for preventing reverse flow of fluid from said branch passage through said second delivery passage to said fourth set of ports.

5. An unloading and relief valve comprising a body having a valve bore and first, second and third sets of ports opening at axially spaced points to said bore, a first delivery passage in communication with one end of said bore and having an inlet adapted for connection to one source of fluid pressure, a second delivery passage connected to said third set of ports and having an inlet adapted for connection to another source of pressure fluid, and exhaust passage connected to said second and first sets of ports, and a cross passage independent of said ports for directing fluid from said second delivery passage to said first delivery passage when the pressure in the latter is lower than in the former, a valve plunger slidable in said bore and exposed at one end to the pressure in said first delivery passage, and normally in position I blocking intercommunication between said sets of ports, adjustable spring means tending to bias said plunger into position I, said plunger having a first recess and a second recess and being movable in response to a predetermined rising pressure gradient in said first delivery passage progressively out of position I first into position II to connect said third set of ports through said second recess to said second set of ports whereby to unload said second delivery passage, and then into position III to connect said first delivery passage through said first recess to said first set of ports whereby to maintain a predetermined maximum pressure in said first delivery passage.

6. A valve according to claim 4 in which the spring means has an expandable end seating against a retainer pad, said pad engaging said plunger and being slidable in a closed oil-filled chamber, said pad and chamber defining a dashpot for damping the movement of said plunger toward and into closed position.

7. In a hydraulic transmission system, an unloading and relief valve structure comprising first and second inlet passages adapted for connection to two separate sources of pressure fluid, first and second delivery passages in communication respectively with said first and second inlet passages and adapted for connection to two separate pressure fluid operable motors, an exhaust passage, a branch passage open to said second delivery passage, a cross passage connecting said second inlet passage with said first delivery passage, and valve means responsive to the pressure in said first delivery passage and operable progressively in the course of a predetermined rising pressure gradient first to connect said first delivery passage to said branch passage, then also to connect said second delivery passage to said exhaust passage, and then also to relieve said first delivery passage to said exhaust passage while maintaining a predetermined maximum pressure in said first delivery passage, a one-way check valve for permitting fluid flow from said second delivery passage through said cross passage to said first delivery passage, and a one-way check valve for preventing fluid flow from said branch passage through said second delivery passage to said second inlet passage.

8. A hydraulic transmission system comprising, in combination, first and second sources of fluid pressure, first and second reversible hydraulic motors, independent first and second start, stop and direction control valves respectively for said motors, first and second fluid supply passages from said sources respectively to said valves, a cross passage including a first check valve for passing fluid from said second supply passage to said first passage, an exhaust passage, a second check valve for preventing reverse flow through said second passage to said second source, and an unloading and relief valve having a valve plunger normally spring-biased into closed position and movable out of closed position in response to a predetermined rising pressure gradient in said first supply passage, said valve being operable in its opening movement progressively first to connect said first supply passage to said second supply passage at the down-stream side of said second check valve, and then to connect said second supply passage at the up-stream side of said second check valve to said exhaust passage, and to relieve said first supply line whereby to maintain a predetermined maximum pressure therein.

References Cited in the file of this patent

UNITED STATES PATENTS

| | | |
|---|---|---|
| 2,277,640 | Harrington | Mar. 24, 1942 |
| 2,475,414 | Towler et al. | July 5, 1949 |
| 2,478,213 | Towler et al. | Aug. 9, 1949 |
| 2,549,897 | Evrell | Apr. 24, 1951 |